United States Patent
Müller

[19]

[11] Patent Number: 5,848,826
[45] Date of Patent: Dec. 15, 1998

[54] BRAKING SYSTEM FOR CONTROLLING THE BRAKING OF A TRAILER

[75] Inventor: Georg Müller, Munich, Germany

[73] Assignee: Knorr-Bremse Systeme Fur Nutzfahrzeuge GmbH, Munich, Germany

[21] Appl. No.: 810,249

[22] Filed: Mar. 3, 1997

[30] Foreign Application Priority Data

Mar. 6, 1996 [DE] Germany .................. 196 08 550.0

[51] Int. Cl.⁶ .................................................. B60T 8/30
[52] U.S. Cl. ........................................ 303/22.4; 303/9.63
[58] Field of Search .................. 303/3, 7, 15, 20, 303/40, 22.1, 22.4, 9, 63

[56] References Cited

U.S. PATENT DOCUMENTS

| 33,697 | 9/1861 | McNinch, Jr. . | |
|---|---|---|---|
| 3,993,362 | 11/1976 | Kamins et al. | 303/7 |
| 4,640,556 | 2/1987 | Fauck et al. | 303/40 |
| 4,682,823 | 7/1987 | Hommen et al. | 303/22.4 |
| 5,330,020 | 7/1994 | Ketcham . | |
| 5,403,073 | 4/1995 | Frank et al. . | |
| 5,427,440 | 6/1995 | Ward et al. | 303/40 |
| 5,477,739 | 12/1995 | Holler et al. . | |
| 5,549,364 | 8/1996 | Mayr-Fröhlich et al. | 303/3 |
| 5,632,530 | 5/1997 | Brearley | 303/22.4 |
| 5,662,301 | 9/1997 | McKay | 303/22.4 |

FOREIGN PATENT DOCUMENTS

| 288 866 | 11/1988 | European Pat. Off. . | |
|---|---|---|---|
| 385 648 A3 | 5/1990 | European Pat. Off. . | |
| 374 484 | 6/1990 | European Pat. Off. . | |
| 433 858 A2 | 6/1991 | European Pat. Off. . | |
| 433 921 A2 | 6/1991 | European Pat. Off. . | |
| 532 863A1 | 3/1993 | European Pat. Off. . | |
| 2 241 704 | 2/1974 | Germany . | |
| 3312981 | 10/1984 | Germany | 303/22.4 |
| 3413759 | 10/1985 | Germany | 303/22.4 |
| 39 11 253 A1 | 6/1990 | Germany . | |
| 4136571 C1 | 11/1991 | Germany . | |
| 41 32 506 A1 | 5/1993 | Germany . | |
| 42 43 245 A1 | 6/1994 | Germany . | |
| 44 12 430 C1 | 8/1995 | Germany . | |
| 44 46 358 C1 | 12/1995 | Germany . | |

*Primary Examiner*—Matthew C. Graham
*Attorney, Agent, or Firm*—Barnes & Thornburg

[57] ABSTRACT

A braking system for controlling the braking of a trailer as a function of the load condition of the trailer, determined by variables measured only on the tractor. In the tractor, a proportional valve is provided which is controlled by an electronic brake control system and, as a function of the determined load condition, provides the brake pressure for the trailer. The connection of a driver brake valve to a trailer brake valve with a select-high function is controlled by at least one fail-safe valve, which is controlled by the electronic brake control system. In normal operation of the electronic brake system, the output of the proportional valve is the output of the trailer brake valve and in faulty operation of the electronic brake system, the output of the driver control valve is the output of the trailer brake valve.

5 Claims, 3 Drawing Sheets

BRAKING SYSTEM FOR CONTROLLING THE BRAKING OF A TRAILER

BACKGROUND AND SUMMARY OF THE INVENTION

The invention relates generally to a braking system for controlling the braking of a trailer hitched to a tractor, and more particularly to braking a semitrailer, while taking into account the load condition of the trailer.

According to the regulations of the European Union, not only all tractors but also all trailers must be provided with an automatic load-dependent braking system (automatic load-dependent power proportioning system) in order to be able to adapt the brake power to the respective load conditions. An example of the construction of a conventional brake system for commercial vehicles is shown in the *Automotive Engineering Manual* by Bosch, 21st Edition, Pages 620, plus. In contrast, such a regulation does not exist in the U.S. and in Japan and in other markets, which is particularly disadvantageous with respect to the wear of the tires and the directional control during a braking operation. Furthermore, for an empty or partially loaded trailer, under conditions of a normal operational braking and without an automatic load-dependent brake power proportioning system, the trailer wheels may lock. This results in a reduced directional control and an increased wear of the tires. In countries without a corresponding regulation, an automatic load-dependent brake power proportioning system function is often not introduced for reasons of cost.

U.S. Pat. No. 4,640,556 shows a load-dependent brake pressure control system for motor vehicles and/or trailer braking systems.

German Patent Document DE 22 41 704 A1 also shows a pressure-medium braking system for motor vehicles having two brake circuits in the tractor. One brake circuit carries pressure medium for the brakes of the front axle and the other brake circuit carries pressure medium for the brakes of the rear axle of the tractor. Further, a trailer braking control valve is arranged on the tractor, which control valve has two pressure medium inputs and one pressure medium output. The pressure of the brake circuits are connected respectively to the two pressure medium inputs. This control valve operates as a "select-high" valve and lets the higher pressure on its two inputs pass through to the output. The output pressure is then connected by a pressure medium pipe with the brake cylinder of the trailer.

An automatic load-dependent braking system always requires that the load or the mass of the vehicles is known. In the case of semitrailer units, the mass of the tractor is known and changes only very slightly as the result of the persons riding along and the amount of fuel in the fuel tank. In practice, this mass can therefore be considered to be constant and known from information from the manufacturer. In contrast, the mass of the trailer or the semitrailer depends decisively on the load and changes within wide limits. German Patent Document DE 39 11 253 A1 therefore suggests to measure the axle loads of the tractor by sensors and to measure additional quantities, such as the brake power, the horizontal and the vertical carrying force, and to control on the basis of these measured quantities the braking pressure for the trailer as a function of its load. In this case, all sensors are situated on the tractor so that a tractor equipped in this manner can be coupled to any trailer, even if this trailer is not equipped with an automatic load-dependent brake power proportioning function.

German Patent Document DE 42 43 245 A1 shows a similar braking system wherein the axle loads of the tractor and the supporting force of the semitrailer are measured at the kingpin. Here also, expensive force sensors are used. German Patent Document DE 41 32 501 also requires sensors which measure the coupling forces between the tractor and the trailer in order to determine from these measured values the coordination of the brake power for the trailer as a function of the load.

German Patent Document DE 44 12 430 C1, corresponding to U.S. Pat. No. 5,549,364 and German Patent Document DE 44 46 358 A1, whose total disclosure content is hereby made the object of the present patent application, describe a braking system in which the mass of the trailer is determined without the use of load sensors or force sensors. More specifically, the mass is determined only on the basis of measured quantities of the speed, of a parameter of the braking and of a parameter of the rotational engine speed, which exist in the vehicle anyhow. Using the determined vehicle mass, the brake power for the trailer is then controlled as a function of its load. Thus, this braking system is basically suitable for being operated together with any trailers, particularly with trailers which have no automatic load-dependent brake power proportioning function.

It is an object of the invention to provide a braking system for controlling the braking of a trailer hitched to a tractor, taking into account the load condition of the trailer where no automatic load-dependent brake power proportioning system is required on the trailer and with low cost, automatic load-dependent brake power proportioning systems capability can also be installed in tractors which have conventional braking systems without any automatic load-dependent brake power proportioning function.

According to the invention, this goal is achieved by recognizing the possibility of being able to carry out a load-dependent braking also without any automatic load-dependent brake power proportioning device. The invention provides a braking system for controlling the braking of a trailer hitched to a tractor, while taking into account the load condition of the trailer. The load condition of the trailer is determined using information concerning the condition of the tractor. A separate automatic load-dependent brake power proportioning device for the trailer is not required which significantly reduces the costs in comparison to a braking system having such a device.

In an embodiment of the invention, the load condition of the trailer is derived from a measurement of the rear axle load force of the tractor (particularly a tractor for a semitrailer). In this case, a particularly simple embodiment of the invention is implemented because the rear axle load force of the tractor can generally be measured by an automatic load-dependent brake power proportioning device of the tractor.

According to a particularly preferred embodiment of the invention, the measuring of the rear axle load force of the tractor takes place by a coupling force calculation. For this purpose, reference is made to the full extent of German Patent DE PS 43 13 198 C2, corresponding to U.S. Pat. No. 5,477,739 and DE 44 12 430 C2, corresponding to U.S. Pat. No. 5,549,364, and to DE 44 46 358 wherein the vehicle mass and the trailer mass can be determined without the use of load or force sensors.

Using the determined load condition of the trailer, in a particularly advantageous manner, the control pressure of the trailer can also be modulated directly. That is, while bypassing or without an automatic load-dependent brake power proportioning device, the brake pressure set by the driver on the tractor is not transmitted directly to the trailer but is first varied as a function of the load condition of the trailer.

Additional advantageous variants of the invention are found in the other subclaims.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
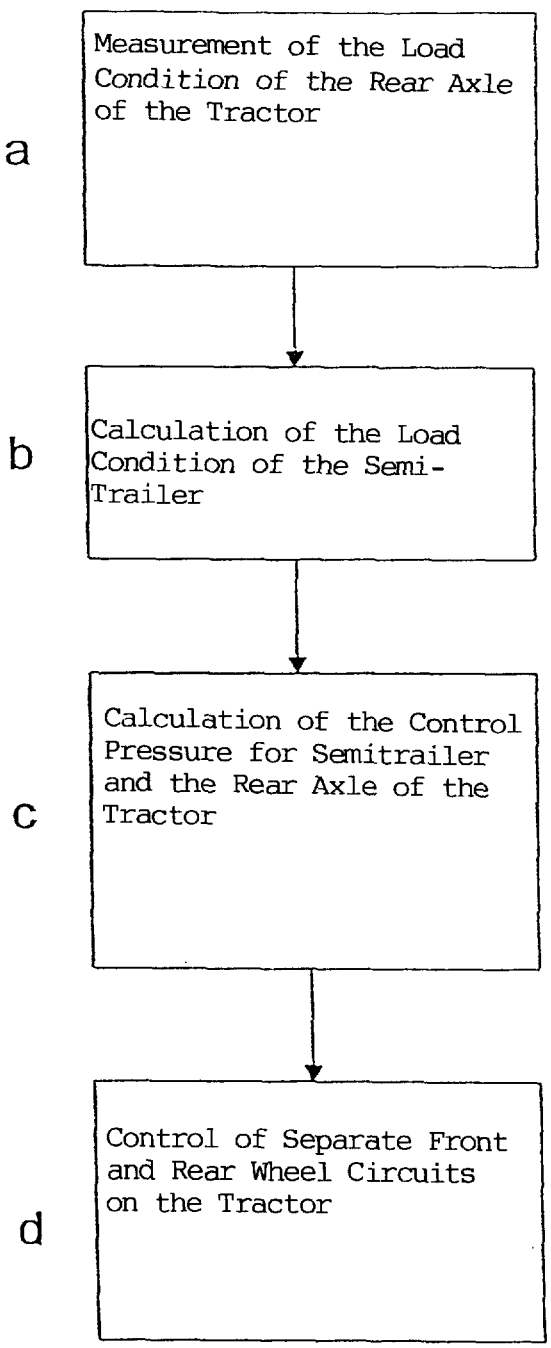
FIG. 1 is a flow chart showing the method of operation of the braking system according to the invention.

According to FIG. 1, a measurement of the rear axle load of the tractor (semitrailer tractor) is carried out at Step A by the automatic load-dependent brake power proportioning function of the semitrailer tractor, for example. From the measured value, for example, in comparison with prestored reference values, load information is then determined concerning the load condition of the semitrailer at Step B. Using the determined or estimated mass of the semitrailer, the control pressure for the semitrailer brakes will then be calculated at Step C and appropriately modulated or adapted for the mass of the semitrailer. For this purpose, a brake circuit on the trailer brake control valve, such as the input from the rear axle circuit of the tractor, is acted upon by a control pressure which is adapted to the actual semitrailer load at Step D.

Figure 2:
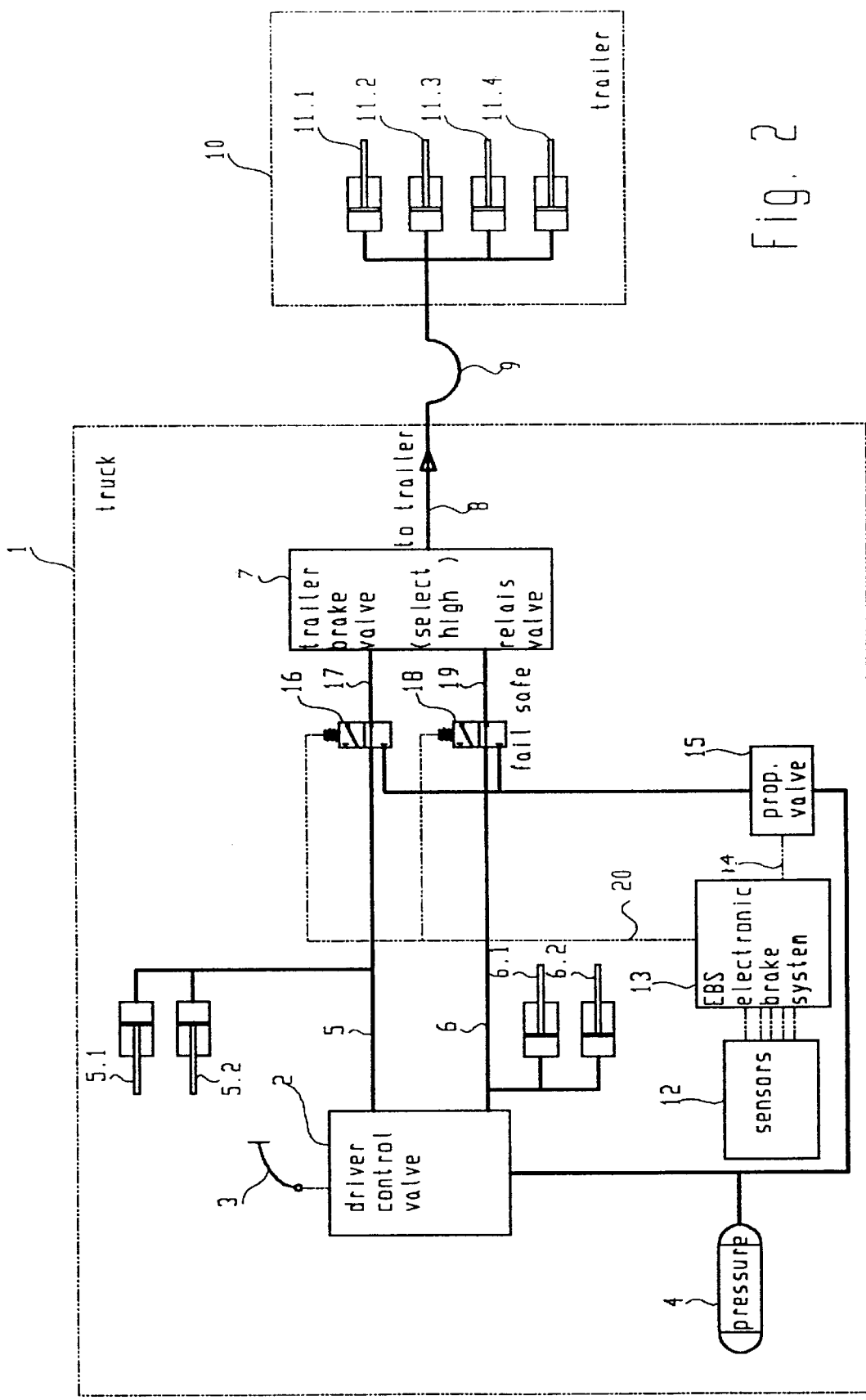
FIG. 2 is a basic circuit diagram of a braking system of the invention according to a first embodiment of the invention.

FIG. 2 shows a braking system according to a first embodiment of the invention. All important parts of the invention are housed on the truck or tractor 1. As a function of the operation of a brake pedal 3, a conventional driver control valve 2 controls the pressure from a pressure medium source 4 to a pipe 5 of a first brake circuit for braking the front axle of the tractor. The pressure medium is therefore guided by pipe 5 to brake cylinders 5.1 and 5.2 of the front axle. In a similar fashion, the second brake circuit has a pipe 6 to which the brake cylinders 6.1 and 6.2 for the brakes of the rear axle are connected.

In the case of the prior art, the two brake pipes 5 and 6 are connected directly to a trailer brake valve 7 situated on the tractor. The trailer brake valve 7, after a select-high function, switches the higher of the two pressures on pipes 5 or 6 through to its output and transmits it to a brake pipe 8 for the trailer. The brake pipe 8 is connected by pipe coupling 9 with the braking system of the trailer 10 and specifically with the brake cylinders 11.1 to 11.4 of the trailer. The select-high function of the trailer brake valve 7 ensures that the trailer will still be braked when one of the brake circuits 5 or 6 of the tractor fails.

The invention is based on the fact that the trailer brake valve continues to be equipped with a select-high function so that the components according to the invention can also be subsequently installed in vehicles which use such a trailer brake valve. In the case of the invention, various sensors 12 are situated on the tractor. This is described particularly in the above-mentioned German Patent 43 13 198, U.S. Pat. No. 5,477,739, German Patent 44 12 430, U.S. Pat. No. 5,549,364 and German Patent 44 46 358. These sensors supply their measured values to an electronic brake system 13 (in the following called EBS) which, as a function of the brake pressure controlled on the tractor and the determined vehicle mass or the determined load of the trailer, modulates the brake pressure for the trailer. According to the invention, the EBS 13 supplies an electric output signal to a line 14 which controls a proportional valve 15. This output signal may be an electric voltage, an electric current or another electric signal sequence, such as a pulse-type signal. The proportional valve 15 is connected to the pressure medium source 4 and, at its output, supplies a braking medium pressure which is proportional to the signal on the line 14. This braking medium pressure is to be supplied to the brake cylinders 11.1 to 11.4 of the trailer. However, if this pressure were supplied directly to the trailer brake valve 7 equipped with the select-high function, this would not permit the automatic load-dependent braking because in most cases, particularly in the case of empty or incompletely loaded trailers, the braking medium pressure for the trailer must be lower than that for the tractor. In most cases, the trailer brake valve would therefore transmit the higher braking medium pressure for the tractor to the trailer.

According to the invention, the output pressure of the proportional valve 15 is supplied as one input respectively of solenoid valves 16 and 18. The other input of the solenoid valve 16 is connected to the pipe 5 of front axle brake circuit. The other input of the solenoid valve 18 is connected to pipe 6 of the rear axle brake circuit. The two solenoid vales 16 and 18 are controlled by an electric control signal on a line 20 from the EBS 13. In this case, the two valves 16 and 18 are constructed as fail-safe or switch-over valves; that is, in the case of normal operating conditions with a perfectly functioning EBS 13, both valves 16 and 18 are actively excited. In the excited position, connect the output of the proportional valve 15 by pipe 17 or 19 with the two inputs of the trailer brake valve 6, which in this case is a relay valve and has the described select-high function. Since the two pressures on pipes 17 and 19 are equally large in this operating condition, and specifically correspond to the output pressure of the proportional valve 15, independently of the select-high function, this pressure is provided by pipe line 8 and the coupling 9 to the brake cylinders 11.1 to 11.4 of the trailer 10. In the active condition, the valves 16 and 18 therefore shut off the braking pressure on the pipes 5 and 6 with respect to the trailer brake valve 7 so that, in the case of actively excited valves 16 and 18, only the pressure modulated by the proportional valve 15 is transmitted to the trailer 10.

In the case of a failure of the EBS 13, the electric signal on the line 20 is switched off and, because of a spring force, the two valves 16 and 18 return into their rest position illustrated in FIG. 2. In this rest position, the input of the valves 16 and 18 connected with the output of the proportional valve 15 is shut off and the pipes 5 and 6 are connected with the lines 17 and 19. In this case, the braking system will then operate conventionally and transmit the higher one of the two pressures on the pipes 5 and 6 to the trailer via the trailer brake valve 7, whereby all safety requirements are met in the case of a failure of the electronic brake system 13.

In this case, the valves 16 and 18 can be a component of a modified trailer control valve which is implemented, for example, as a relay valve which has two control inputs. This naturally requires a front-axle brake circuit and a rear-axle brake circuit.

Figure 3:
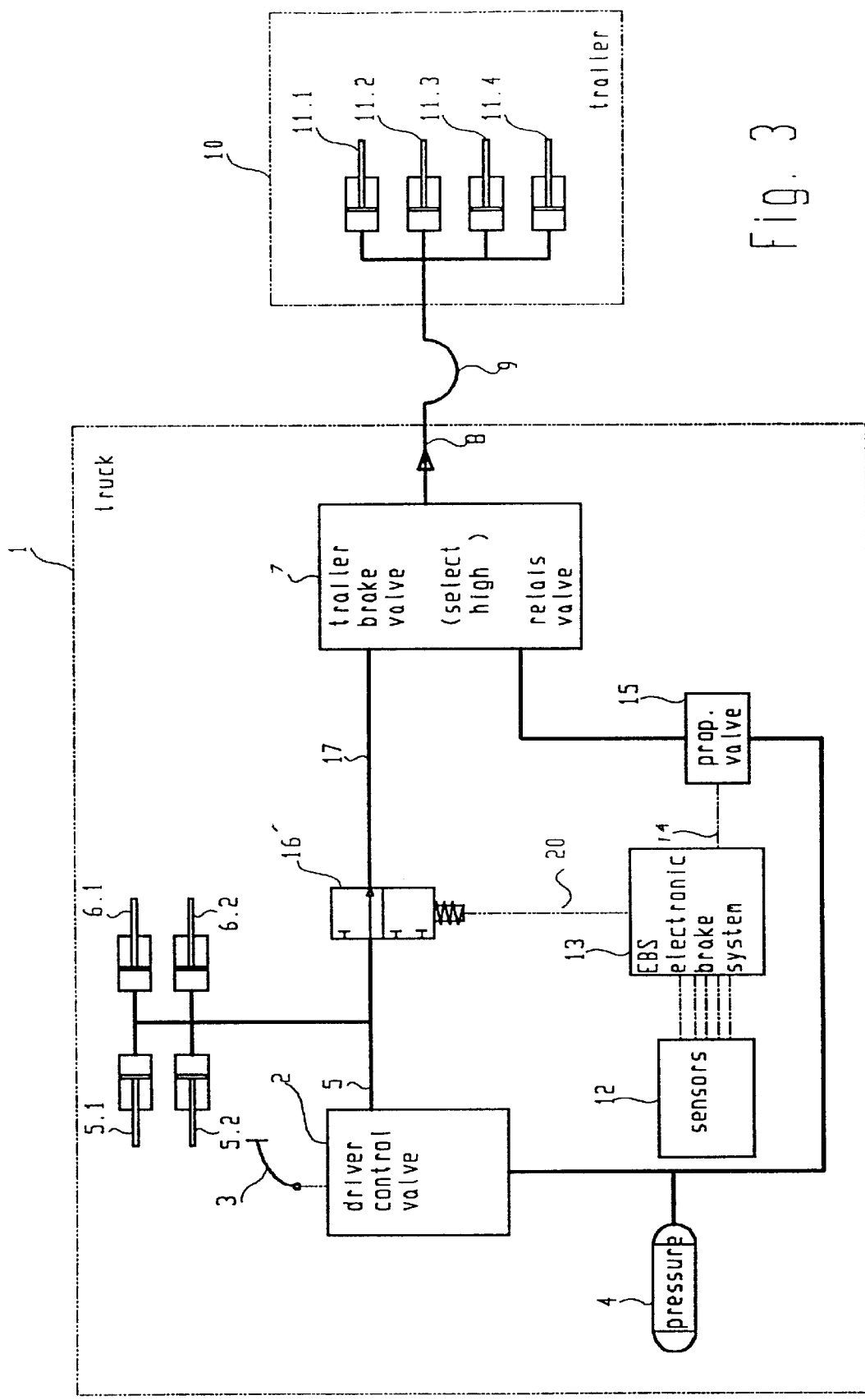
FIG. 3 is a basic circuit diagram of a braking system of the invention according to a second embodiment of the invention.

FIG. 3 illustrates an embodiment of the invention wherein the tractor is equipped only with a single brake circuit 5 for the brake cylinders of the front axle 5.1 and 5.2 and the brake cylinders of the rear axle 6.1 and 6.2. The mentioned valves are therefore connected to the single brake pressure pipe 5 of the driver control valve 2. Here also, as in the embodiment of FIG. 2, a trailer brake valve 7 is used which has a select-high function. An input of trailer brake valve 7 is connected by line 17 to a shut-off valve 16' with a fail-safe function. The input of the shut-off valve 16' is connected to the pipe 5. Also the valve 16' is controlled by the EBS 13. When the valve 16' is excited, thus in the active condition, the connection from the pipe 5 to the trailer control valve 7 is shut-off. Also in this embodiment and in the same manner as in FIG. 2, a sensor 12, an EBS 13 and a proportional valve 15 are used. However, the pressure medium output of the proportional valve 15 is connected directly to the second input of the trailer braking valve 7.

In the normal operation of the EBS 13, the valve 16 is excited and thus the pressure on pipe 5 is shut off with respect to the trailer brake valve 7. In the case of a normal braking, the output pressure of the proportional valve 15 is therefore the higher one and is transmitted from the trailer brake valve 7 by way of the pipe 8 and the coupling 9 to the trailer 10. In the case of a failure of the EBS 13, no signal which excites the valve 16' exists on the line 20. Therefore, because of the force of an installed spring, the valve 16' returns into the rest position illustrated in FIG. 3 in which the pipe 5 is switched through to the trailer brake valve 7. This pressure will then be the higher one of the two input pressures and reaches the trailer 10. Thus, the safety function is ensured should the EBS 13 fail.

In another embodiment, not shown, the fail-safe valve 16' of FIG. 3 could be substituted for the fail-safe valve 16 in FIG. 2. Thus, the output of the proportional valve 15 would only be connected to the fail-safe valve 18. During normal operation of the EBS, the only input signal to the trailer brake valve 7 would be the output of the proportional valve through fail-safe valve 18.

Summarizing, an automatic load-dependent brake power proportioning function is implemented or simulated without the requirement of additional valves or a high-expenditure sensor system on the trailer or semitrailer by the installation of a proportional valve 15 switched in front of the trailer control valve 7 and at least one suitable fail-safe valve 16 as an input of a brake circuit of the tractor.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. Braking system on a tractor for controlling the braking of a trailer in a vehicle including said tractor and trailer, said system on the tractor comprising:

a pressure medium source;

a driver brake valve having an output and being connected with the pressure medium source;

at least one brake circuit connecting the output of the driver brake valve to brake cylinders of the tractor;

a select high trailer brake valve which connects the higher pressure on one of its first and second inputs with its output, said output being connected with brake cylinders of the trailer;

several sensors;

an electronic brake system connected with said sensors and which determines the load condition of the trailer, generates a first electric signal which is proportional to the brake pressure to be controlled at the trailer as a function of this load condition, and generates a second electric signal;

a proportional valve, having an output connected as an input to the trailer brake valves being controlled by the first electric signal, being connected to the pressure medium source, and which provides at its output an output pressure proportional to the first electric signal; and at least one fail-safe valve having an input connected with an output of the driver brake valve and having an output connected with an input of the trailer brake valve, and the at least one fail-safe valve being controlled by said second electric signal to disconnect output of the brake control valve from the trailer brake valve during the presence of said second electrical signal and to connect the output of the driver brake valve to the trailer brake valve in the absence of said second electrical signal.

2. A braking system according to claim 1, wherein the trailer brake valve is a relay valve.

3. A braking system according to claim 1, wherein the tractor includes only one brake circuit and only one fail-safe valve with the output of the fail-safe valve being connected with the first input of the trailer brake valve; and the output of the proportional valve is connected directly with the second input of the trailer brake valve.

4. A braking system according to claim 1, wherein:

the tractor includes two brake circuits and two fail-safe valves, the brake circuits are each connected to a first input of a respective fail-safe valve;

the output of each fail-safe valve is connected with a respective input of the trailer brake valve;

both fail-safe valves are controlled by the second electrical signal;

the output of the proportional valve is connected to a second input of at least one of the two fail-safe valves; and said at least one fail-safe valve disconnects the output of the driver brake valve from the trailer brake valve and connects the output of the proportional valve with the respective input of the trailer brake valve during the presence of the second electrical signal, and disconnects the output of the proportional valve from the trailer brake valve and connects the output of the driver brake valve to the respective input of the trailer brake valve in the absence of said second electrical signal.

5. A braking system according to claim 4, wherein the output of the proportional valve is connected as a second input to both fail-safe valves which operate identically.

* * * * *